United States Patent
Iwata (10) Patent No.: US 6,647,336 B1
(45) Date of Patent: Nov. 11, 2003

(54) MAP DISPLAY TERMINAL AND MAP DISPLAY METHOD

(75) Inventor: Shinichiro Iwata, Tokyo (JP)

(73) Assignee: NEC Corporation, Tokyo (JP)

( * ) Notice: Subject to any disclaimer, the term of this patent is extended or adjusted under 35 U.S.C. 154(b) by 23 days.

(21) Appl. No.: 09/627,231

(22) Filed: Jul. 27, 2000

(30) Foreign Application Priority Data

Aug. 11, 1999 (JP) .......................................... 11-227056

(51) Int. Cl.$^7$ ................................................ G06F 7/00
(52) U.S. Cl. ...................................... 701/208; 701/212
(58) Field of Search ............................... 701/207, 212, 701/208, 209, 213; 340/988, 990, 991, 993, 995

(56) References Cited

FOREIGN PATENT DOCUMENTS

| CA | 1190183 A | 8/1998 |
|---|---|---|
| CA | 1201183 A | 12/1998 |
| EP | 0312361 A1 | 10/1988 |
| EP | 0 312 361 A1 | 4/1989 |
| GB | 2287535 A | 9/1995 |
| GB | 2298539 A | 9/1996 |
| GB | 2322248 A | 8/1998 |
| JP | 03-156486 | 7/1991 |
| JP | 8043112 | 2/1996 |
| JP | 10-134079 | 5/1998 |
| JP | 10222062 | 8/1998 |
| JP | 11-038872 | 2/1999 |
| JP | 11-184376 | 7/1999 |
| JP | 11230778 | 8/1999 |
| WO | WO 97/04334 A1 | 2/1997 |

OTHER PUBLICATIONS

Chinese Office Action dated Dec. 27, 2002 with an English translation.

Primary Examiner—William A. Cuchlinski, Jr.
Assistant Examiner—Edward Pipala
(74) Attorney, Agent, or Firm—McGinn & Gibb, PLLC (57) ABSTRACT

A map display apparatus and a map display method facilitate detection of relationship between the destination (current position) and the peripheral condition even when a detailed map is to be displayed on the narrow display area. The map display terminal displays a particular position, a current position, a destination, on a map by deriving the current position on the basis of a position information from a satellite. The map display apparatus has first means for displaying a wide area map having smaller reduced scale than a detailed map and centered at said current position upon displaying said detailed map centered at said current position.

17 Claims, 7 Drawing Sheets

MAP DISPLAY TERMINAL AND MAP DISPLAY METHOD

BACKGROUND OF THE INVENTION

1. Field of the Invention

The present invention relates generally to a map display terminal and a map display method. More particularly, the invention relates to a map display method for displaying a map corresponding to a current position on the basis of a current position information.

2. Description of the Related Art

In the recent years, an apparatus displaying a current position utilizing a Global Positioning System (GPS) technology has been widely spreading primarily for vehicular navigation system. In such apparatus, a map data to be displayed is stored in a storage medium, such as CD-ROM or the like so as to display a corresponding map on the basis of a current position information obtained by GPS.

On the other hand, in addition to application for the vehicular navigation system, a handy type map display terminal has been put into practical use. Since these apparatus are required to be portable, the apparatus are compact to be impossible to store all of map data, amount of which is huge. Therefore, these apparatus are designed to download the necessary map data by means of communication means.

As advantage of a system, in which the map data are arranged in a map server on a network and is downloaded as required, the latest map data can be constantly provided, and the user may able to obtain the latest map data constantly. It is also possible to distribute real-time information, such as traffic information or the like by embedding in the map data.

In case of the handy type map display terminal set forth above, in which the map data is downloaded, portability of such type of the map display terminal is essential to make a display area narrow to cause difficulty of displaying information of a destination and facilities, such as railway station, intersection and so forth, to be landmarks, in one picture frame. Therefore, when map display is performed taking the destination (current position) at the center of display, difficulty is encountered in detecting the relationship with the peripheral condition.

On the other hand, in case of the handy type map display terminal set forth above, until completion of downloading of the map data for initially displaying the map after completion of downloading, the user may not be able to check the progress of downloading.

SUMMARY OF THE INVENTION

Therefore, the present invention has been worked out for solving the problems set forth above. It is an object of the present invention to provide a map display apparatus and a map display method which facilitates detection of relationship between the destination (current position) and the peripheral condition even when a detailed map is to be displayed on the narrow display area.

Another object of the present invention is to provide a map display apparatus and a map display method which permits to check progress of downloading of detailed map information.

According to one aspect of the invention, a map display terminal for displaying a current position on a map by deriving the current position on the basis of a position information from a Global Positioning System, comprising:

first means for displaying a wide area map having smaller reduced scale than a detailed map and centered at the current position upon displaying the detailed map centered at the current position.

In the preferred construction, the map display terminal further comprises second means for displaying the initially displayed wide area map with expansion in step-by-step manner until the detailed map is displayed. The second means may include means for downloading detailed map information from a server storing the detailed map information.

The map display terminal may be a portable communication terminal. In such case, a communication between the portable communication terminal and the server is performed through a portable telephone network. In the alternative, the communication between the portable communication terminal and the server is performed through a packet network.

The second means may expands display of the wide area map in step-by-step manner depending upon progress of downloading of the detailed map information. The second means may include means for calculating an expansion ratio at each display stage on the basis of a ratio of reduced scales of the wide area map and the detailed map, number of display stages, progress of downloading.

According to the second aspect of the present invention, a map display method for displaying a map of a current position by deriving the current position on the basis of a position information from a satellite, comprises:

first step of displaying a wide area map having smaller reduced scale than a detailed map and centered at the current position upon displaying the detailed map centered at the current position.

The method preferably further comprises second step of displaying the initially displayed wide area map with expansion in step-by-step manner until the detailed map is displayed. The second step may includes step of downloading detailed map information from a server storing the detailed map information. In such case, a communication between the portable communication terminal and the server is performed through a portable telephone network. In the alternative, the communication between the portable communication terminal and the server is performed through a packet network. The second step may expand display of the wide area map in step-by-step manner depending upon progress of downloading of the detailed map information. The second step may include step for calculating an expansion ratio at each display stage on the basis of a ratio of reduced scales of the wide area map and the detailed map, number of display stages, progress of downloading.

According to the third aspect of the present invention, a storage medium storing a map display control program for displaying a map of a current position by deriving the current position on the basis of a position information from a satellite, the control program comprising:

first step of displaying a wide area map having smaller reduced scale than a detailed map and centered at the current position upon displaying the detailed map centered at the current position.

The storage medium may further comprise second step of displaying the initially displayed wide area map with expansion in step-by-step manner until the detailed map is displayed.

Namely, the map display method according to the present invention displays the wide area map centered at a particular position, such as destination, current position or so forth, with expansion in step-by-step manner depending upon progress of downloading upon downloading the detailed map information from the map server.

More particularly, in the map display method according to the present invention, when the detailed map (wherein, the detailed map has a larger arithmetic value of its scale ratio than a wide area map. For example, the arithmetic value of a scale ratio of 1/100 for the detailed map is larger than the arithmetic value of a scale ratio of 1/10,000 for a wide area map.) centered at the particular position detected by the GPS in response to the demand of the user, at first, demand for the detailed map data is performed for the map server, and at the same time, the wide area map (wherein, the wide area map has a smaller arithmetic value of its scale ratio than a detailed map. For example, the arithmetic value of a scale ratio of 1/10,000 for the wide area map is smaller than the arithmetic value of a scale ratio of 1/100 for a detailed map.) preliminarily stored in the terminal is displayed.

Subsequently, in the map display method according to the present invention, the wide area map is displayed with expansion in step-by-step manner depending upon the progress of downloading of the detailed map data. After completion of downloading, the detailed map is displayed.

By this, even when the detailed map is displayed on the narrow display area, a relationship between the particular position, e.g. destination or current position and the peripheral condition, can be easily seen. Also, progress of downloading of the detailed map can also be seen easily.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structure are not shown in detail in order to avoid unnecessary obscurity of the present invention.

Figure 1:
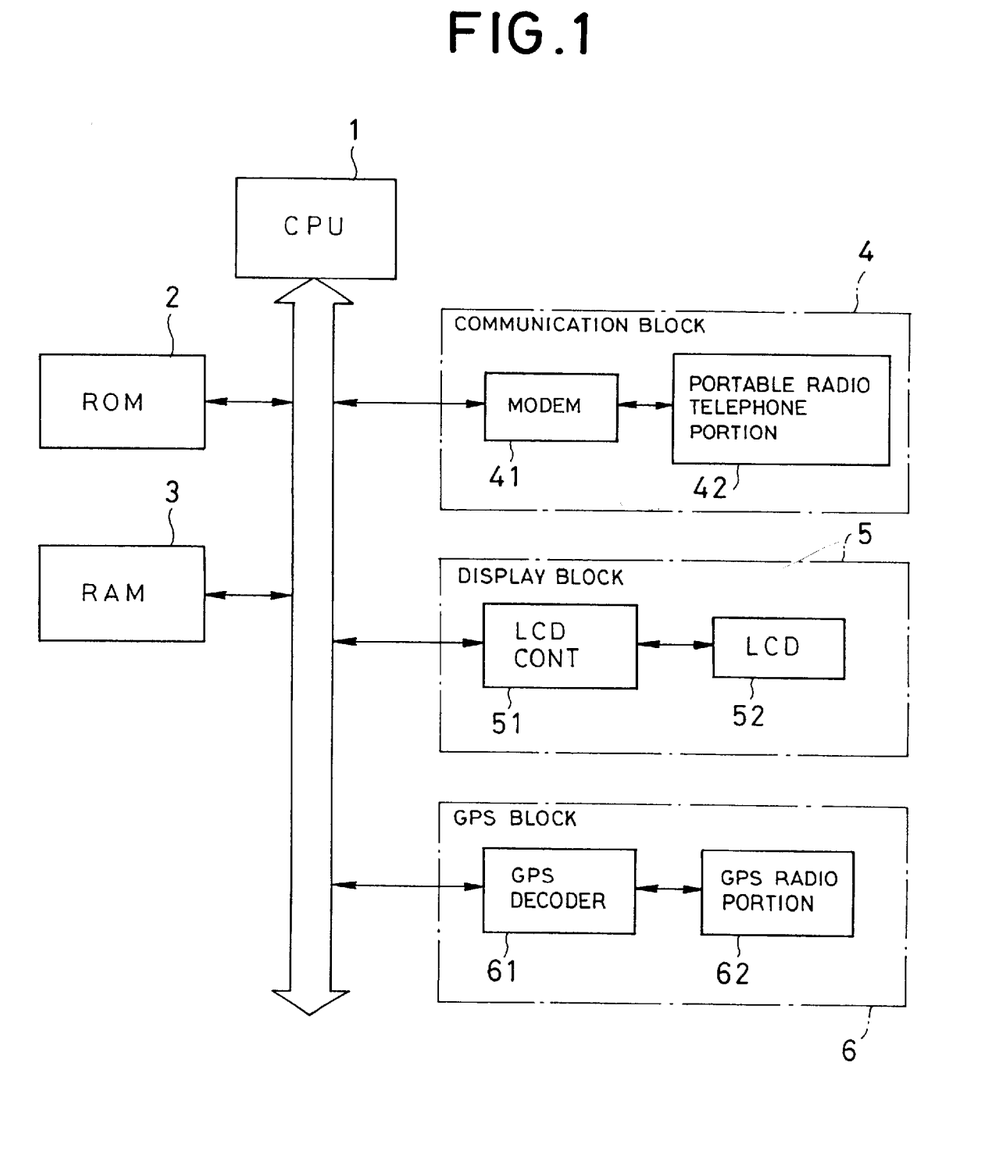
FIG. 1 is a block diagram showing a construction of one embodiment of a GPS map display terminal with a communication function according to the present invention.

FIG. 1 is a block diagram showing a construction of one embodiment of a map display terminal according to the present invention. In FIG. 1, one embodiment of the map display terminal according to the present invention is constructed with a central processing unit (CPU) 1, a read-only-memory (ROM) 2, a random-access memory (RAM) 3, a communication block 4, a display block 5 and a GPS block 6.

CPU 1 performs control of overall system including control of the communication block 4, the display block 5 and the GSP block 6 according to programs stored in ROM 2. ROM 2 stores the programs for operating the system and a wide area map data (wherein, the wide area map has a smaller arithmetic value of its scale ratio than a detailed map. For example, the arithmetic value of a scale ratio of 1/10,000 for the wide area map is smaller than the arithmetic value of a scale ratio of 1/100 for a detailed map.). RAM 3 is used as a work area.

The communication block 4 is constructed with a modem 41 and a portable radio telephone portion 42 for forming means for establishing connection with an internet using a portable telephone network. The display block 5 is constructed with a LCD controller (Liquid Crystal Display Controller) 51 and an LCD 52. The LCD controller 51 performs data display, such as map display or the like, on the LCD 52 under command from CPU 1.

The GPS block 6 is constructed with a GPS decoder 61 and a GPS radio communication portion 62 for receiving a radio wave broadcasted from a Global Positioning System (not shown) and notifying the current position, as latitude and longitude information to CPU 1.

Figure 2:
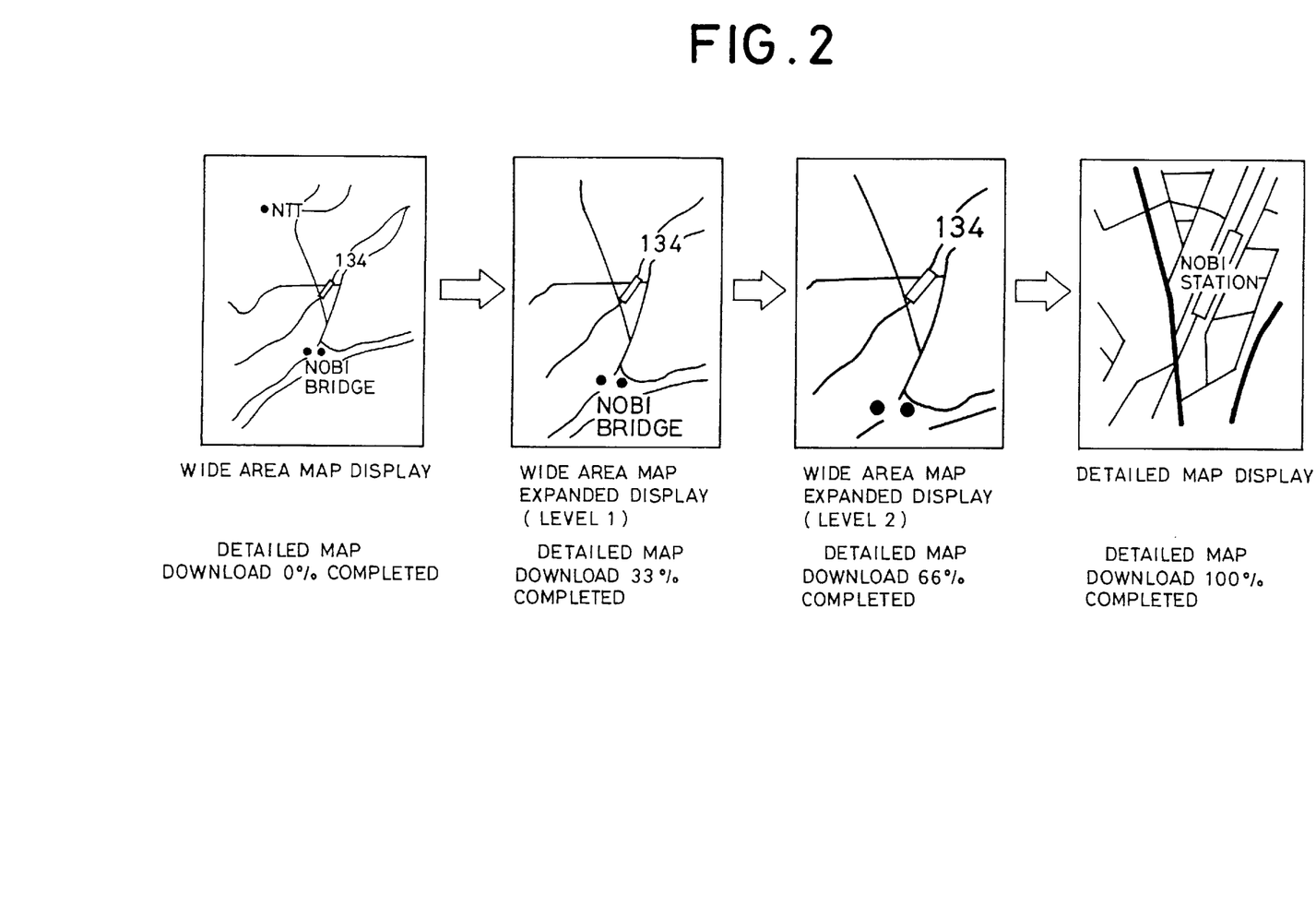
FIG. 2 is an illustration showing an order of map display in one embodiment of the GPS map display terminal according to the present invention.

FIG. 2 is an illustration showing an order of map display in one embodiment of the map display terminal according to the present invention. In FIG. 2, upon displaying a detailed map (wherein, the detailed map has a larger arithmetic value of its scale ratio than a wide area map. For example, the arithmetic value of a scale ratio of 1/100 for the detailed map is larger than the arithmetic value of a scale ratio of 1/10,000 for a wide area map.) around a destination (current position measured by GPS) according to a demand of the user, CPU 1 performs a detailed map data demand to a map server from a communication block 4, at first. At the same time, the wide area map (wherein, the wide area map has a smaller arithmetic value of its scale ratio than a detailed map. For example, the arithmetic value of a scale ratio of 1/10,000 for the wide area map is smaller than the arithmetic value of a scale ratio of 1/100 for a detailed map.) which is preliminarily provided in ROM 2, is displayed in the display block 5.

Subsequently, CPU 1 expands display of the wide area map in step-by-step manner according to progress of downloading of the detailed map data. Namely, CPU 1 performs expanded display of the wide area map of level 1 when 33% of downloading is completed, for example, expanded display of the wide area map of level 2 when 66% of downloading is completed, and the detailed map display when 100% of downloading is completed.

Figure 3:
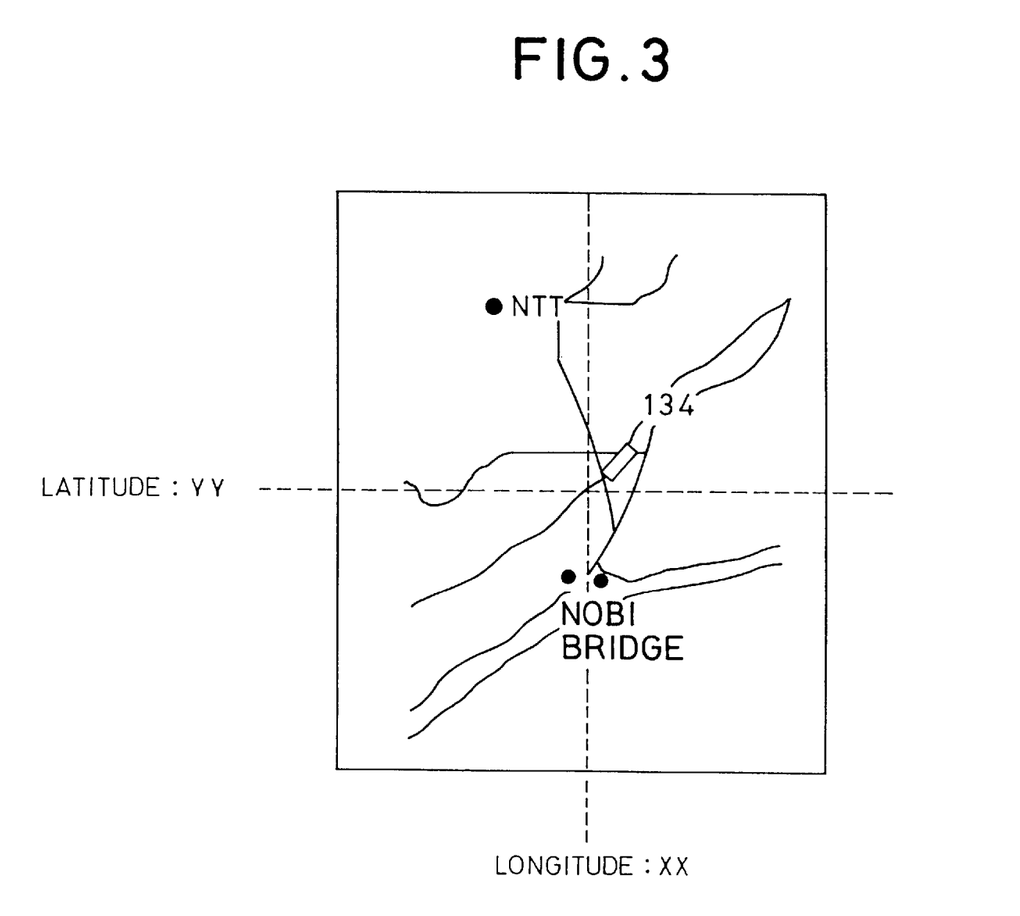
FIG. 3 is an illustration showing a wide area map data to be stored in ROM of FIG. 1.

FIG. 3 is an illustration showing the wide area map data stored in ROM 2 of FIG. 1. FIG. 3 shows that, as the wide area map data stored in ROM 2, when latitude and longitude data is applied, a map data in bitmap format adapting to the size of a display area of the LCD and centered at the location identified by the latitude and the longitude data is obtained.

On the other hand, upon displaying the map data, the map display terminal can display the map at arbitrary reduced scale.

Figure 4:
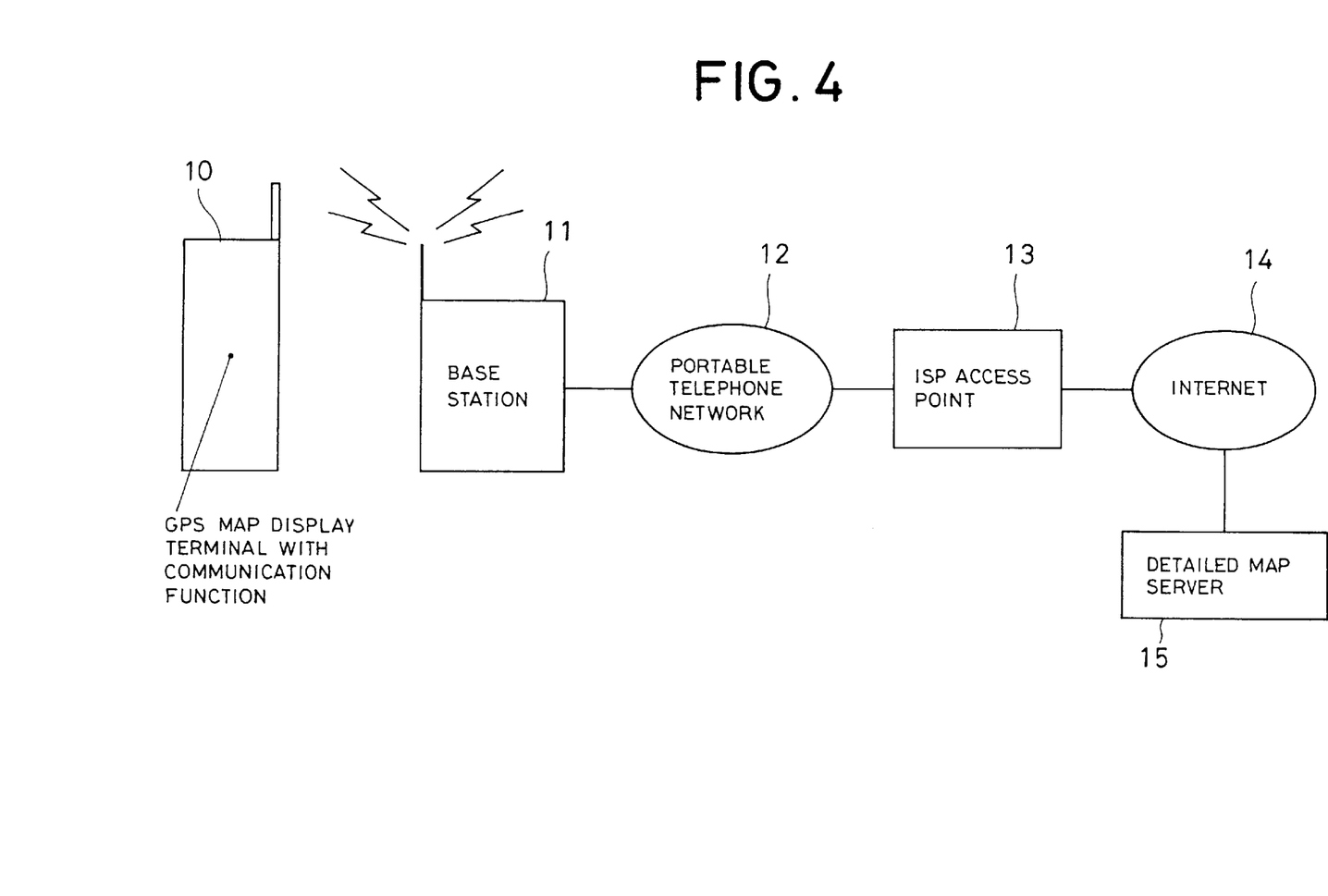
FIG. 4 is a block diagram showing a construction of one embodiment of the map display system according to the present invention.

FIG. 4 is a block diagram showing one embodiment of a map display system according to the present invention. In FIG. 4, one embodiment of the map display system according to the present invention is constructed with the GPS map display terminal 10 with the communication function, a base station 11, a portable telephone network 12, an internet service provider (ISP) access point 13, an internet 14 and a detailed map server 15.

The GPS map display terminal 10 with the communication function can access the internet 14 by establishing connection with the ISP access point 13 through the base station 11 and the portable telephone network 12. On the other hand, the GPS map display terminal 10 with the communication function has the same construction as the map display terminal shown in FIG. 1.

It should be noted that the base station 11, the portable telephone network 12, the ISP access point 13 and the internet 14 have the same constructions as those been practiced conventionally. Therefore, detailed description for these components will not be discussed.

The detailed map server 15 is a typical web server connected to the internet 14 and can transfer the detailed map data or the like according to HTTP (Hyper Text Transfer Protocol).

The detailed map server 15 holds more detailed map data than the wide area map stored in ROM 2 in the GPS map display terminal 10 with the communication function. A map format of the detailed map is equivalent to that of the wide area map stored in ROM 2. The detailed map server 15 is responsive to a demand for the detailed map from the GPS map display terminal 10 with the communication function by designating latitude and longitude of the arbitrary location, to provide the detailed map data centered at the location identified by the applied latitude and longitude to the GPS map display terminal 10 with the communication function.

In general, detailed map is necessary in the city and not so detailed map is required in mountainous area or so forth. Even in the shown embodiment of the system, the reduced scale of the detailed map provided by the detailed map server 15 is different at different area. Namely, a ratio between the reduced scale of the wide area map stored in ROM 2 and the reduced scale of the detailed map provided by the detailed map server 15 is also different at different area.

The detailed map server 15 is responsive to designation of the latitude and longitude from the GPS map display terminal 10 with the communication function and demand for the reduced scale ratio, to provide the ratio of reduced scale (magnification) between the detailed map data centered at the location identified by the latitude and longitude and the wide area map data, to the GPS map display terminal 10 with the communication function.

Figure 5:
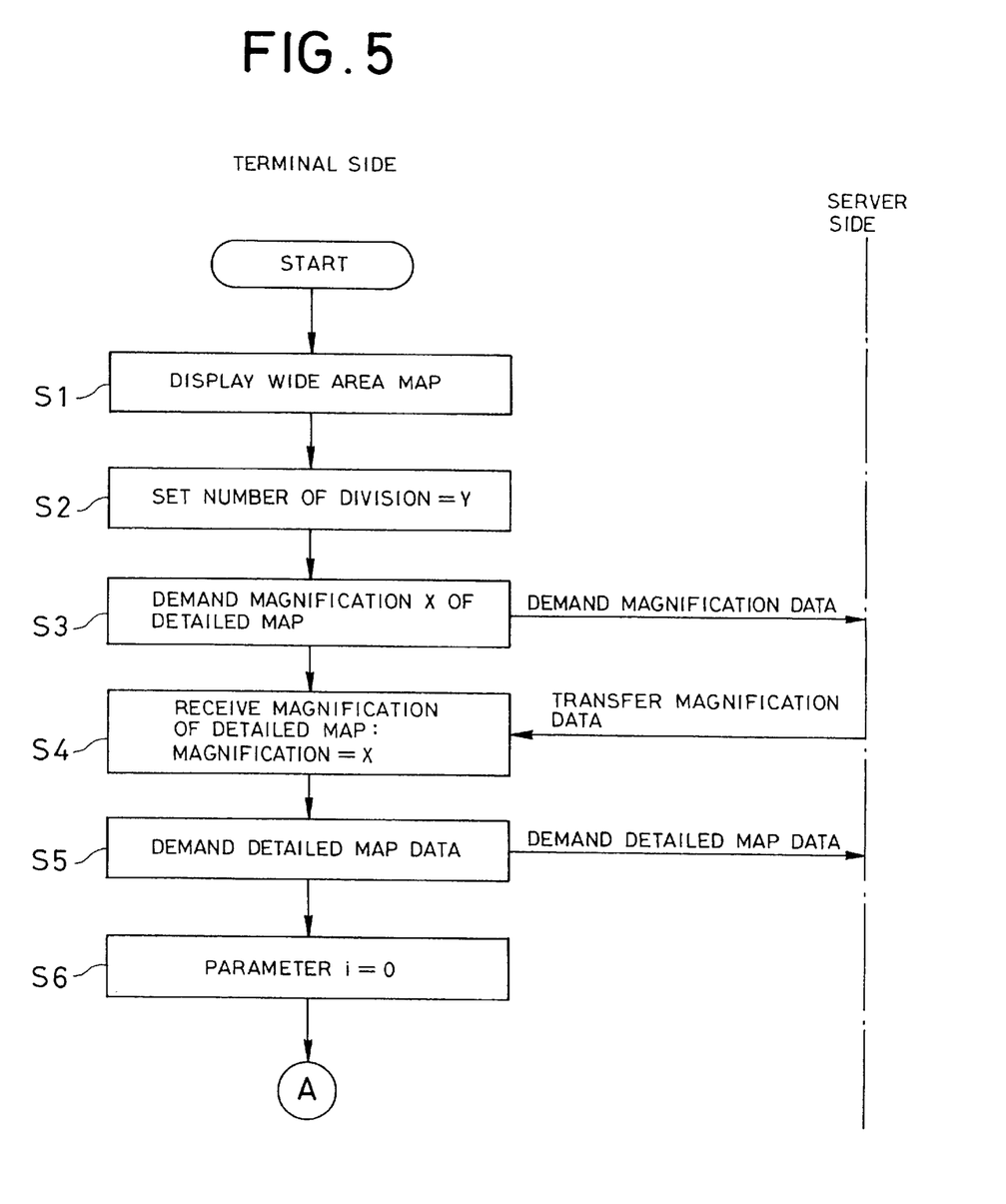
FIG. 5 is a flowchart showing a part of a map display process by one embodiment of the map display system according to the present invention.
Figure 6:
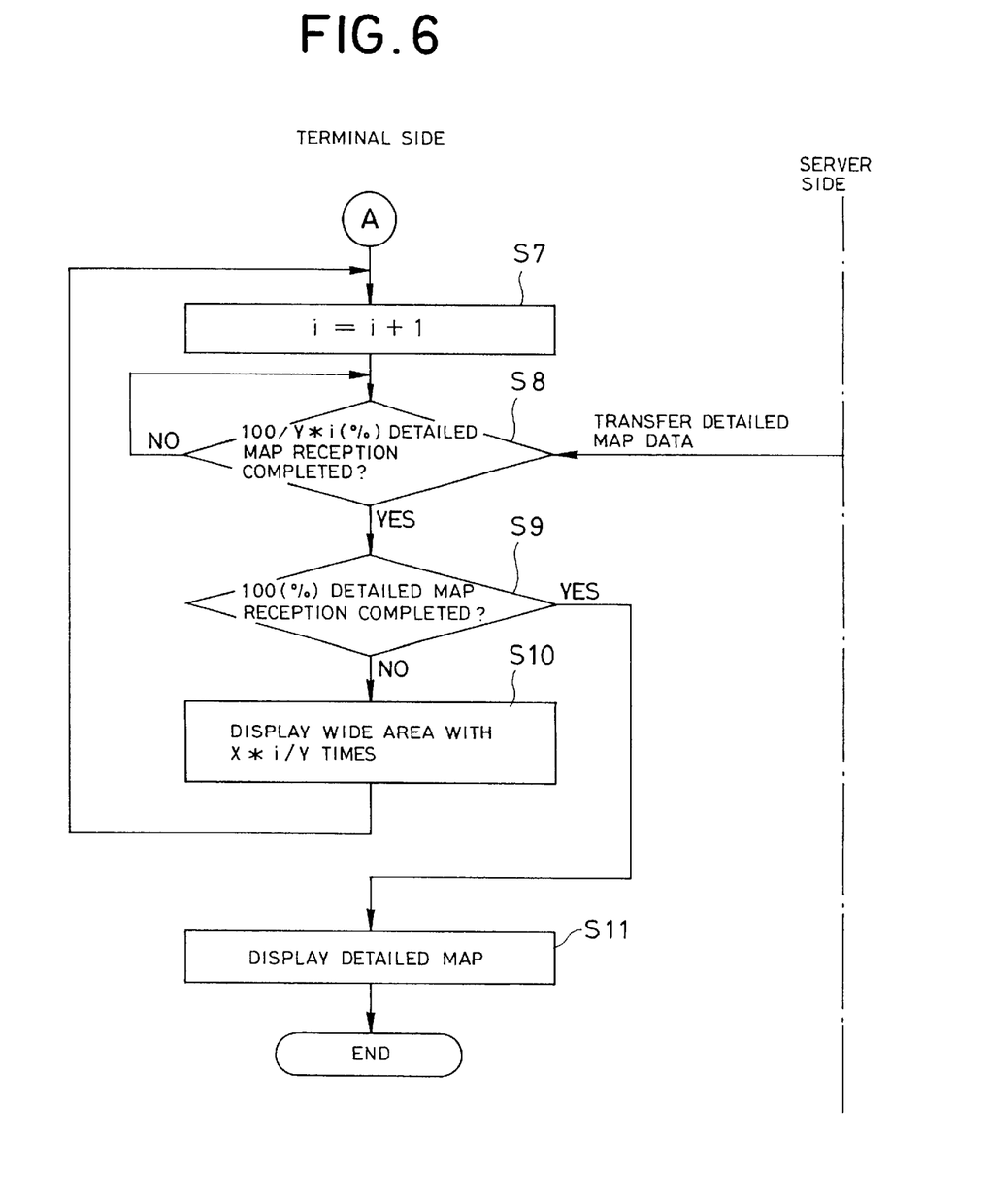
FIG. 6 is a flowchart showing a part of a map display process by one embodiment of the map display system according to the present invention.

FIGS. 5 and 6 are flowcharts showing the map display process to be performed by one embodiment of the map display system according to the present invention. The map display process according to one embodiment of the map display system according to the present invention will be discussed with reference to FIGS. 1 to 6. The operation for displaying the detailed map centered at the current position on the basis of the GPS position information will be discussed hereinafter. The process shown in FIGS. 5 and 6 can be realized by executing the program stored in ROM 2 by CPU 1.

CPU 1 of the GPS map display terminal 10 with the communication function, at first, performs wide area map display centered at the current position on the basis of the GPS position information (latitude, longitude) (step S1 of FIG. 5). Here, the wide area map data stored in ROM 2 is displayed as it is without expansion (magnification of 1).

CPU 1 sets number of division (number of steps upon performing expanded display) to a parameter Y (step S2 of FIG. 5). In case of the example of the map display shown in FIG. 2, at a timing where the progress of downloading is 33% and at a timing where the progress of downloading is 66%, the wide area map is displayed with progressively expanding in step-by-step, and at a timing where the progress of downloading is 100%, the detailed map is displayed.

Namely, in order to perform three steps of expanding display from the initial wide area map display, number of division in this case becomes three. For example, in case of number of division is four, the map display will be updated at timings of progress of downloading at 25%, 50% 75% and 100%. Setting of number of division may be set preliminarily by the user.

CPU 1 requires magnification X of the reduced scale of the corresponding detailed map data with respect to the wide area data on the basis of the latitude and longitude data to the detailed map server 15 (step S3 of FIG. 5), and sets a magnification value returned from the detailed map server 15 to a parameter X (step S4 of FIG. 5). In this disclosure, the magnification means the ratio of the reduced scales of the wide area map and the detailed map. For instance, when the reduced scale of the wide area map is 1/50000 and the reduced scale of the detailed map is 1/25000, the magnification X becomes two (2).

After receiving the magnification value, CPU demands the detailed map data corresponding to the latitude and longitude data with respect to the detailed map server 15 (step S5 of FIG. 5) and then enter into operation for expanded display for expanding the wide area map according to the progress of downloading until downloading is completed.

Upon performing operation for expanded display, CPU 1 at first sets a counter parameter i to 0 (step S6 of FIG. 5). Next, the counter parameter i is incremented by 1 (i=i +1) (step S7 of FIG. 6).

At this state, the system enters into downloading progress waiting state of the detailed map data (step S8 of FIG. 8). For example, in case that number of division is three, judgment of branching becomes "YES" at the downloading progress of 33%, 66% and 100%. HTTP is used for downloading. In this method, since the size of the file is initially transferred, the progress can be easily calculated by comparing the transferred file size and the actually downloaded data amount.

If the result of judgment of the condition is "YES", CPU 1 makes judgment whether the progress of downloading is 100% or not (step 9 of FIG. 6). If the result of judgment at step S9 is "NO", the wide area map is displayed with expansion at a magnification derived by:

$$X*i/Y$$

(step S10 of FIG. 6). For example, when number of division is three and a ratio of reduced scale of the detailed map versus the contraction scale of the wide area map is four, the wide area map is expanded to 1.3 times when the downloading progress is 33%, and to 2.6 times when the downloading progress is 66%.

CPU 1 repeats the procedure from step S7 to step S10 until the downloading progress becomes 100%. Once, downloading is completed, the detailed map is displayed (step S11 of FIG. 6). Then, process goes end.

As set forth above, by initially displaying the wide area map (wherein, the wide area map has a smaller arithmetic value of its scale ratio than a detailed map. For example, the arithmetic value of a scale ratio of 1/10,000 for the wide area map is smaller than the arithmetic value of a scale ratio of 1/100 for a detailed map.) stored in ROM 2, even when the detailed map is displayed in narrow display area, it can be easily perceived the relationship between the destination (current position) and the peripheral condition.

On the other hand, by displaying the initially displayed wide area map with progressively expanding in step-by step manner depending upon downloading progress of the detailed map data, progress of downloading of the detailed map data can be easily appreciated.

Figure 7:
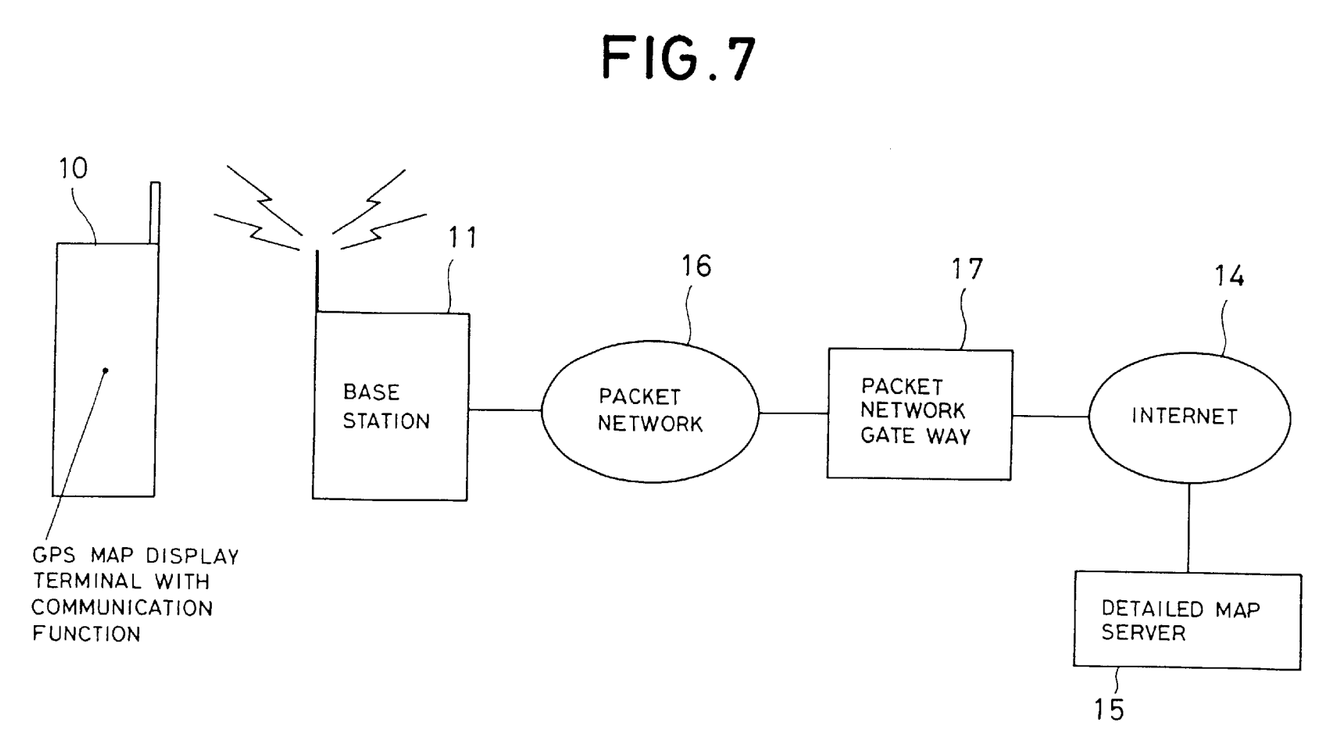
FIG. 7 is a block diagram showing a construction of another embodiment of the map display system according to the present invention.

FIG. 7 is a block diagram showing a construction of another embodiment of the map display system according to the present invention. In FIG. 7, another embodiment of the map display system is constructed with the GPS map display terminal 10 with the communication function, the base station 11, a packet network 16, a gate way 17 of the packet network, the internet 14 and the detailed map server 15.

In the former embodiment of the map display system according to the present invention, the system takes a construction, in which the internet 14 is accessed by establishing connection with the ISP access point 13 by circuit connection. In the recent years, since packet switching service utilizing radio infrastructure for the portable telephone has been available, it is possible to employ a construction to establish connection with the internet 14 using this service.

In the shown embodiment of the map display system according to the present invention, the foregoing construction has been taken to establish connection between the packet network 16 and the internet 14 through the packet network gate way 17. In the shown embodiment of the map display system according to the present invention, since only means for accessing the internet 14 is modified, other portions are similar to the former embodiment of the map display system according to the invention.

On the other hand, while, in the former embodiment of the map display system according to the present invention, the wide area map data is stored in ROM 2 in the GPS map display terminal 10 with the communication function, it is also possible to construct the system for downloading the wide area map per se from the detailed map data. In such case, since map data is not provided in the terminal, further downsizing of the terminal can be permitted. However, since the wide area map has to be downloaded initially, it inherently take longer period for initially displaying the wide area map.

Furthermore, while the former embodiment of the map display system according to the present invention employs the bit map format as the data format of the map, a vector system may also be employed. The vector system is a data format storing information of road, ground profile and so forth as aggregate of lines on the basis of the coordinate data. The map display method according to the present invention can be realized when it permits expanded display of the map, no map data format is specified or restricted.

As set forth above, with the map display terminal according to the present invention, when the current position is displayed on the map by deriving the current position on the basis of the position information from a satellite, upon displaying the detailed map centered to the current position, a relationship between the destination (current position) and the peripheral condition can be easily seen even when the detailed map is to be displayed in the narrow display area by displaying the wide area map centered to the current position.

On the other hand, with another embodiment of the map display terminal according to the present invention, by displaying the wide area map with expansion of the initially displayed wide area map in step-by-step until the detailed map is displayed, progress of downloading of the detailed map can be seen easily.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A map display method that displays maps of a current position on a map display terminal and derives said current position from a Global Positioning System (GPS), the method, comprising:

initially displaying a wide area map; and automatically magnifying said wide area map in a step-by-step manner to display at each step a magnified map until a most highly magnified map is displayed, wherein map displays of said wide area map, said magnified map, and said most highly magnified map are centered on said current position.

2. A map display method as set forth in claim 1 further comprising:

downloading map display information of said most highly magnified map from a server.

3. A map display method as set forth in claim 2, further comprising:

communicating between said map display terminal and said server through a portable radio telephone network.

4. A map display method as set forth in claim 3, further comprising:

communicating between said portable map display terminal and said server through a packet network.

5. A map display method as set forth in claim 1, wherein a number of steps by which said wide area map is automatically magnified in a step-by-step manner is determined by a geographic position corresponding to said current position of said map display terminal.

6. A map display method as set forth in claim 1, wherein after initially displaying said wide area map, said automatically magnifying is performed without operator interaction.

7. A map display method that displays maps of a current position on a map display terminal and derives said current position from a Global Position System (GPS), the method, comprising:

initially displaying a wide area map;

automatically magnifying said wide area map in a step-by-step manner to display at each step a magnified map until a most highly magnified map is displayed; and downloading map display information of said most highly magnified map from a server, wherein said automatically magnifying said wide area map in a step-by-step manner depends upon progress of said downloading map display information of said most highly magnified map information.

8. A map display method as set forth in claim 7, wherein automatically magnifying said wide area map includes determining an expansion ratio for each step on a basis of a ratio of scale values of said wide area map and said most highly magnified map, and a number of steps.

9. A storage medium for storing a map display control program that displays maps of a current position on a map display terminal and derives said current position from a Global Positioning System (GPS), wherein said map display control program initially displays a wide area map and automatically magnifies said wide area map in a step-by-step manner to display at each step a magnified map until a most highly-magnified map is displayed, and wherein map displays of said wide area map, said magnified map, and said most highly magnified map are centered on said current position.

10. A storage medium for storing a map display control program as set forth in claim 9 wherein a number of steps by which said wide area map is automatically magnified in a step-by-step manner is determined by a geographic position corresponding to said current position of said map display terminal.

11. A storage medium for storing a map display control program as set forth in claim 9 wherein after initially displaying said wide area map, said automatically magnifying is performed without operator interaction.

12. A map display terminal for displaying a current position of said map display terminal on map displays by deriving said current position from a Global Positioning System (GPS), said map display terminal, comprising:

a read-only memory (ROM) including map display information for a wide area map;

a central processing unit (CPU);

a display block including a liquid crystal display (LCD) and an LCD controller under control of said CPU that initially displays said wide area map, automatically magnifies said wide area map in a step-by-step manner to display at each step a magnified map until a most highly magnified map is displayed, and centers map displays of said wide area map, said magnified map, and said most highly magnified map on said current position; and a GPS block including a GPS radio receiver and a GPS decoder that derives said current position.

13. A map display terminal as set forth in claim 12 further comprising a communication block including a radio telephone transceiver that communicates with a server to obtain map display information of said most highly magnified map.

14. A map display terminal as set forth in claim 13 further comprising a random access memory (RAM), wherein said CPU initiates a demand of said server via said communication block to download display information of said most highly magnified map into said RAM.

15. A map display terminal as set forth in claim 14 wherein said communication block includes a radio telephone transceiver that communicates with said server through a packet network to obtain map display information of said most highly magnified map.

16. A map display terminal as set forth in claim 12 wherein a number of steps by which said wide area map is automatically magnified in a step-by-step manner by said CPU is determined by a geographic position corresponding to said current position as determined by said CPU block.

17. A map display terminal as set forth in claim 12 wherein after initially displaying said wide area map, said automatically magnifying is performed without operator interaction.

* * * * *

UNITED STATES PATENT AND TRADEMARK OFFICE
CERTIFICATE OF CORRECTION

| | | |
|---|---|---|
| PATENT NO. | : 6,647,336 B1 | Page 1 of 1 |
| APPLICATION NO. | : 09/627231 | |
| DATED | : November 11, 2003 | |
| INVENTOR(S) | : Shinichiro Iwata | |

It is certified that error appears in the above-identified patent and that said Letters Patent is hereby corrected as shown below:

Title page, item [56]
    In the list of References Cited, change "CA 1190183 A" and "CA 1201183 A" to --CN 1190183A-- and --CN 1201183 A--.

Signed and Sealed this

Thirty-first Day of October, 2006

JON W. DUDAS
*Director of the United States Patent and Trademark Office*